United States Patent
Jung

(10) Patent No.: US 8,798,132 B2
(45) Date of Patent: Aug. 5, 2014

(54) VIDEO APPARATUS TO COMBINE GRAPHICAL USER INTERFACE (GUI) WITH FRAME RATE CONVERSION (FRC) VIDEO AND METHOD OF PROVIDING A GUI THEREOF

(75) Inventor: Jae-woong Jung, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1112 days.

(21) Appl. No.: 12/120,875

(22) Filed: May 15, 2008

(65) Prior Publication Data

US 2009/0135910 A1    May 28, 2009

(30) Foreign Application Priority Data

Nov. 27, 2007    (KR) ........................ 10-2007-0121717

(51) Int. Cl.
*H04N 7/12* (2006.01)
*H04N 5/445* (2011.01)
*H04N 7/01* (2006.01)

(52) U.S. Cl.
CPC ............ *H04N 5/445* (2013.01); *H04N 7/0127* (2013.01)
USPC .................................................. 375/240.01

(58) Field of Classification Search
None
See application file for complete search history.

(56) References Cited

U.S. PATENT DOCUMENTS

| 7,616,264 | B1 * | 11/2009 | Greenberg ..................... 348/584 |
| 2001/0022816 | A1 * | 9/2001 | Bakhmutsky et al. ... 375/240.17 |
| 2005/0163465 | A1 * | 7/2005 | Liebhold et al. ................ 386/46 |
| 2006/0227249 | A1 * | 10/2006 | Chen et al. ..................... 348/631 |
| 2007/0025442 | A1 * | 2/2007 | Okada et al. ............. 375/240.03 |
| 2008/0198264 | A1 * | 8/2008 | Balram ......................... 348/459 |

FOREIGN PATENT DOCUMENTS

| EP | 1 404 130 A1 | 3/2004 |
| JP | 2007-259193 | 10/2007 |
| KR | 2006-106079 | 10/2006 |

OTHER PUBLICATIONS

EP Search Report issued Aug. 25, 2011 in EP Patent Application No. 08163556.7.

* cited by examiner

*Primary Examiner* — Kevin C Harper
(74) *Attorney, Agent, or Firm* — Stanzione & Kim, LLP

(57) ABSTRACT

A video apparatus to combine a graphical user interface (GUI) with a frame rate conversion (FRC) video. The video apparatus combines a GUI with an area of a video in which a frame rate is converted. By performing a FRC, a moving image having increased quality is provided for a user, and minimizing artifacts from occurring around a boundary of a still image such as a GUI.

19 Claims, 5 Drawing Sheets

VIDEO APPARATUS TO COMBINE GRAPHICAL USER INTERFACE (GUI) WITH FRAME RATE CONVERSION (FRC) VIDEO AND METHOD OF PROVIDING A GUI THEREOF

CROSS-REFERENCE TO RELATED APPLICATIONS

This application claims priority under 35 U.S.C. §119(a) from Korean Patent Application No. 10-2007-0121717, filed on Nov. 27, 2007, in the Korean Intellectual Property Office, the disclosure of which is incorporated herein by reference in its entirety.

BACKGROUND OF THE INVENTION

1. Field of the Invention

The present general inventive concept relates to a video apparatus and a method of providing a graphical user interface (GUI) thereof. More particularly, the present general inventive concept relates to a video apparatus which provides a user with a GUI used to input a user command or to set configuration of a video apparatus, and a method of providing a GUI thereof.

2. Description of the Related Art

A frame rate conversion (FRC) is used to convert a frame rate of video stream to be output through a display. The FRC makes the motion of objects smoother and therefore more pleasant for eyes. Therefore, the quality of motion picture performing the FRC is enhanced.

However, if the FRC is performed for the video data including both the still image data and moving image data, the video quality is poor. More specifically, if the FRC is performed for a moving image including a still image such as GUI, artifacts occur around a boundary of the GUI.

FIG. 1 illustrates a view in which FRC is performed for a moving image 5 including a GUI 10, and thus has artifacts 20 occurring around a boundary of the GUI 10.

SUMMARY OF THE INVENTION

The present general inventive concept provides method of and a video apparatus to combine a GUI with a FRC video to minimize and/or prevent artifacts from occurring around a boundary of a GUI when a FRC is performed, and a method of providing a GUI thereof.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a video apparatus, including a conversion unit to convert a frame rate of a video, and a graphical user interface (GUI) combination unit to generate a GUI, and to combine the generated GUI with a predetermined area of the converted frame rate video.

The conversion unit may convert a frame rate of the video using motion estimation and motion compensation (MEMC).

The conversion unit may convert a frame rate of the video from 60 (Hertz) Hz to 120 Hz, or from 50 Hz to 100 Hz.

The apparatus may further comprise a signal receiving unit to receive a data signal, a video decoding unit to decode a video included in the received data signal, a scaling unit to scale the video decoded by the video decoding unit, and to transmit the scaled video to the conversion unit, and an output unit to display the video combined with the generated GUI from the GUI combination unit.

The foregoing and/or other aspects and utilities of the present general inventive concept may be achieved by providing a method of providing a graphical user interface (GUI), including converting a frame rate of a video, generating a GUI, and combining the generated GUI with a predetermined area of the converted frame rate video.

The method may further include converting a frame rate of the video using motion estimation and motion compensation (MEMC).

The method may further include converting a frame rate of the video from 60 Hz to 120 Hz, or from 50 Hz to 100 Hz.

The method may further include receiving a data signal, decoding a video included in the received data signal, and scaling the decoded video, wherein the converting may include converting a frame rate of the scaled video, and displaying the converted frame rate video combined with the generated GUI.

The foregoing and/or other aspects and utilities of the present general inventive concept may be achieved by providing a video apparatus, including a conversion unit to convert a frame rate of a moving image, and a combination unit to combine a still image with the moving image in which the frame rate is converted by the conversion unit.

The moving image may be received by the video apparatus, and the still image may be stored in the video apparatus.

The foregoing and/or other aspects and utilities of the present general inventive concept may also be achieved by providing a method of providing a graphical user interface (GUI) of a video apparatus, including converting a frame rate of a moving image, and combining a still image with the converted frame rate moving image.

The moving image may be received by the video apparatus, and the still image may be stored in the video apparatus.

The foregoing and/or other aspects and utilities of the present general inventive concept may be also achieved by providing a method of providing a video, including converting a frame rate of a first video, and displaying the first video on a first layer, displaying a second video on a second layer without converting a frame rate of the second video, and combining the first layer with the second layer.

The second layer may display a graphic to be overlayed on the video on the first layer.

The foregoing and/or other aspects and utilities of the present general inventive concept may also be achieved by providing a computer readable medium having recorded thereon a program to implement a method of providing a graphical user interface (GUI), the method including converting a frame rate of a video, generating a GUI, and combining the generated GUI with a predetermined area of the video with the converted frame rate.

The foregoing and/or other aspects and utilities of the present general inventive concept may also be achieved by providing a computer readable medium having recorded thereon a program to implement a method of providing a graphical user interface (GUI), the method including converting a frame rate of a moving image, and combining a still image with the converted frame rate moving image.

The foregoing and/or other aspects and utilities of the present general inventive concept may also be achieved by providing a computer readable medium having recorded thereon a program to implement a method of providing a graphical user interface (GUI), the method including converting a frame rate of a first video, and displaying the first video on a first layer, displaying a second video on a second layer without converting a frame rate of the second video, and combining the first layer with the second layer.

The foregoing and/or other aspects and utilities of the present general inventive concept may be achieved by providing a method of displaying a video, including converting a frame rate of a video, combining the converted frame rate video with a least one image to form a composite video, and displaying the composite video image.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
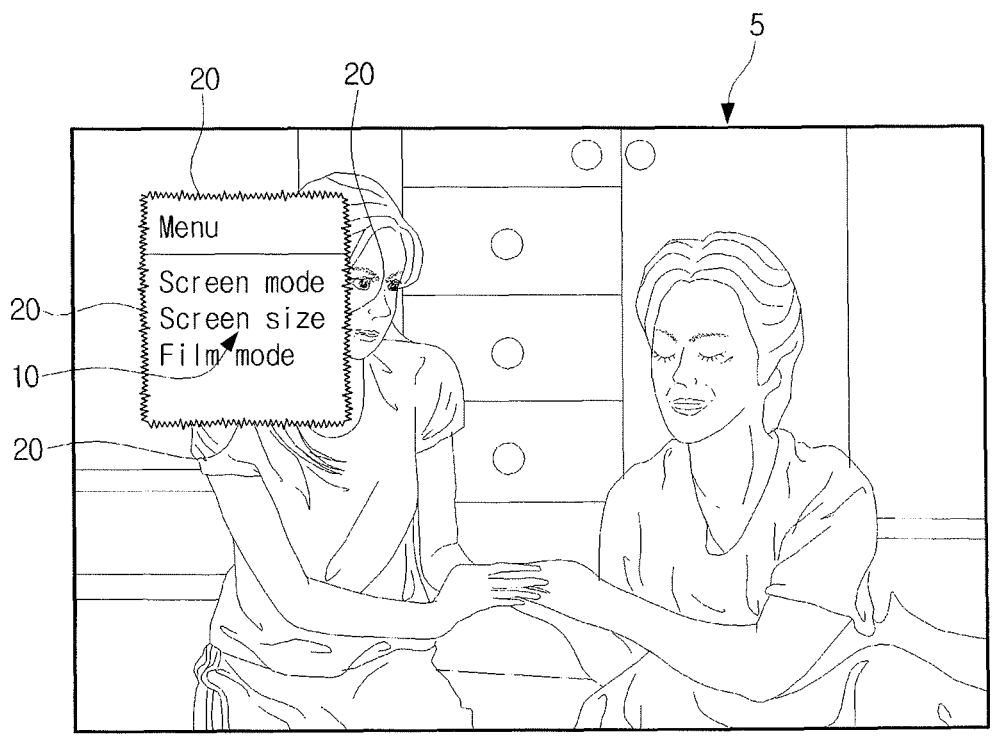
FIG. 1 illustrates a resulting image from performing a frame rate conversion (FRC) for a moving image including a graphical user interface (GUI), where the resulting image includes artifacts.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
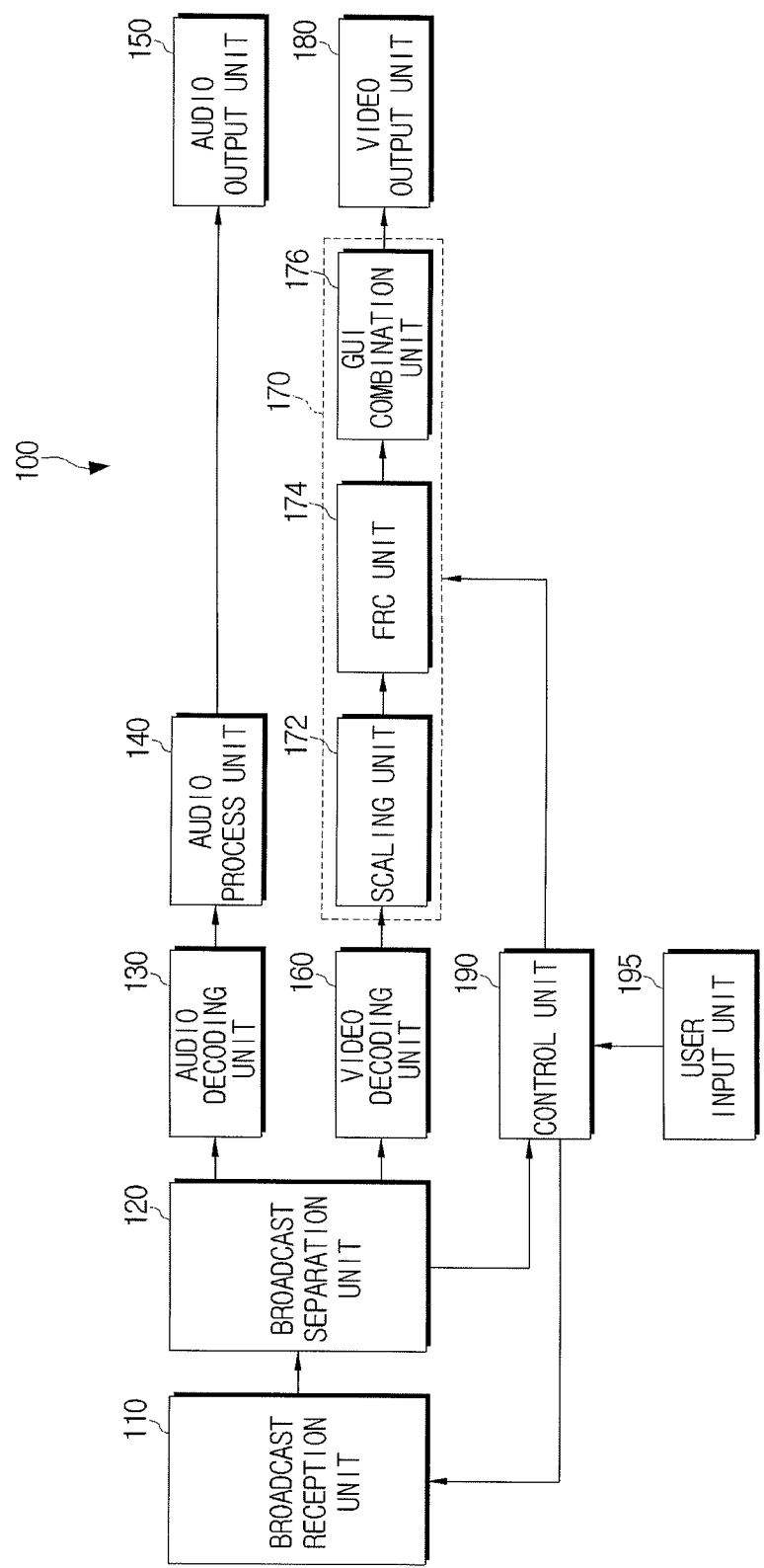
FIG. 2 is a block diagram illustrating a digital television (DTV) according to an exemplary embodiment of the present general inventive concept.

FIG. 2 is a block diagram illustrating a digital television (DTV) 100 according to an exemplary embodiment of the present general inventive concept. The DTV 100 of FIG. 2 combines a graphical user interface (GUI) with a frame rate converted (FRC) video.

The DTV 100 may include a signal reception unit 110, a signal separation unit 120, an audio decoding unit 130, an audio process unit 140, an audio output unit 150, a video decoding unit 160, a video process unit 170, a video output unit 180, a control unit 190, and a user input unit 195.

The signal reception unit 110 tunes to a signal received via a wired communications link or wirelessly through the air, and demodulates the signal that is tuned to. For example, the signal may be a broadcast digital television signal, a digital television signal received via cable, a signal received from a storage device communicatively coupled to DTV 100, or any other suitable signal.

The signal separation unit 120 separates a signal output from the signal reception unit 110 into an audio signal, a video signal, and additional data, and outputs the separated signals. The audio and video signals separated from the received signal are transmitted to the audio decoding unit 130 and the video decoding unit 160, respectively. Additional data such as program and system information protocol (PSIP) information are transmitted to the control unit 190.

The audio decoding unit 130 decodes an audio signal output from the signal separation unit 120. Accordingly, the audio decoding unit 130 outputs a decoded (e.g., decompressed, processed, etc.) audio signal.

The audio process unit 140 converts a decoded audio signal output from the audio decoding unit 130 into an audio signal which is capable of being output through a speaker provided to the DTV 100.

The audio output unit 150 outputs through a speaker an audio signal output from the audio process unit 140.

The video decoding unit 160 decodes a video signal output from the signal separation unit 120. Accordingly, the video decoding unit 160 outputs a decompressed audio signal.

The video process unit 170 converts a decoded video signal output from the video decoding unit 160 into a video signal which is capable of being output through a display provided to the DTV 100. The video process unit 170 may include a scaling unit 172, a frame rate conversion (FRC) unit 174, and a graphical user interface (GUI) combination unit 176.

The scaling unit 172 scales a video signal output from the video decoding unit 160 to proportion the video to a display of the DTV 100.

The FRC unit 174 performs a FRC for a video scaled by the scaling unit 172. For example, if a video transmitted from the scaling unit 172 has a frame rate of 60 Hz, the FRC unit 174 may convert the frame rate of the video from 60 Hz to 120 Hz. The FRC unit 174 increases a frame rate to provide a user with a video having smooth and efficient movement.

The FRC unit 174 may use motion estimation and motion compensation (MEMC) to increase a frame rate of an input video. The FRC unit 174 inserts one frame per one frame to increase a frame rate of a video from 60 Hz to 120 Hz. For example, if 60 frames are input to the FRC unit 174 per second, total 120 frames are output from the FRC unit 174 per second.

The GUI combination unit 176 generates a GUI to be displayed on a display under the control of the control unit 190. The GUI generated by the GUI combination unit 176 is a type of information displayed on a display in which a user interfaces with the DTV 100. The GUI may include, for example, a user input display such as a menu screen, a display for controlling the operation of the DTV 100, or any other suitable graphical user interface information.

The GUI combination unit 176 combines a generated GUI with a FRC video output from the FRC unit 174.

The video output unit 180 outputs a video (including a GUI output from the GUI combination unit 176) to a display.

The user input unit 195 transmits an input user command to the control unit 190. The user input unit 195 may be an input device on a panel of a DTV, a device to receive a user command input from a remote controller, or any other suitable input device.

The control unit 190 controls one or more operations of the DTV 100 according to a user command received from the user input unit 195. The control unit 190 controls the signal reception unit 110 to output an audio program, a video program, or audio-visual program corresponding to a user command, and controls the GUI combination unit 176 to provide a GUI which a user requests to a display.

Figure 3:
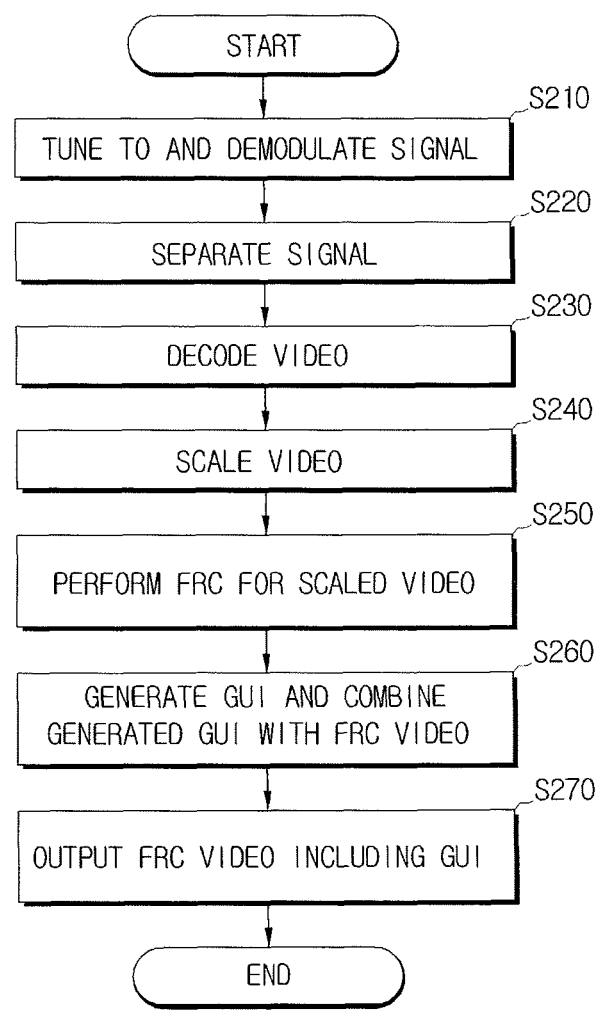
FIG. 3 is a flowchart provided to illustrate a method of providing a GUI according to an exemplary embodiment of the present general inventive concept.

An exemplary process by which a DTV provides a user with a GUI through a display is described below with reference to FIG. 3. FIG. 3 is a flowchart that illustrates a method of providing a GUI according to an exemplary embodiment of the present general inventive concept.

Referring to FIG. 3, in operation S210, the signal reception unit 110 (illustrated in FIG. 2) tunes to a signal, and demodulates the signal that is tuned to. In operation S220, the signal separation unit 120 separates the demodulated signal into an audio signal, a video signal, and additional data.

The audio signal separated in operation S220 is decoded by the audio decoding unit 130, processed by the audio process unit 140, and output through the audio output unit 150 of FIG. 2.

In operation S230, the video decoding unit 160 decodes the video signal separated in operation S220. A decompressed video signal is generated in operation S230. In operation S240, the scaling unit 172 scales the decoded video signal.

In operation S250, the FRC unit 174 performs a FRC for the video scaled in operation S240. For example, a frame rate of the scaled video is doubled by performing operation S250. The FRC unit 174 may use MEMC to increase a frame rate, which is described above.

The FRC video from operation S250 is transmitted to the GUI combination unit 176.

In operation S260, the GUI combination unit 176 generates a GUI to be displayed on a display, and combines the generated GUI with the FRC video generated in operation S250.

In operation S270, the video output unit 180 outputs through a display the FRC video on which the GUI is combined in operation S260.

Operations S240 to S260 are described below with reference to FIG. 4.

Figure 4:
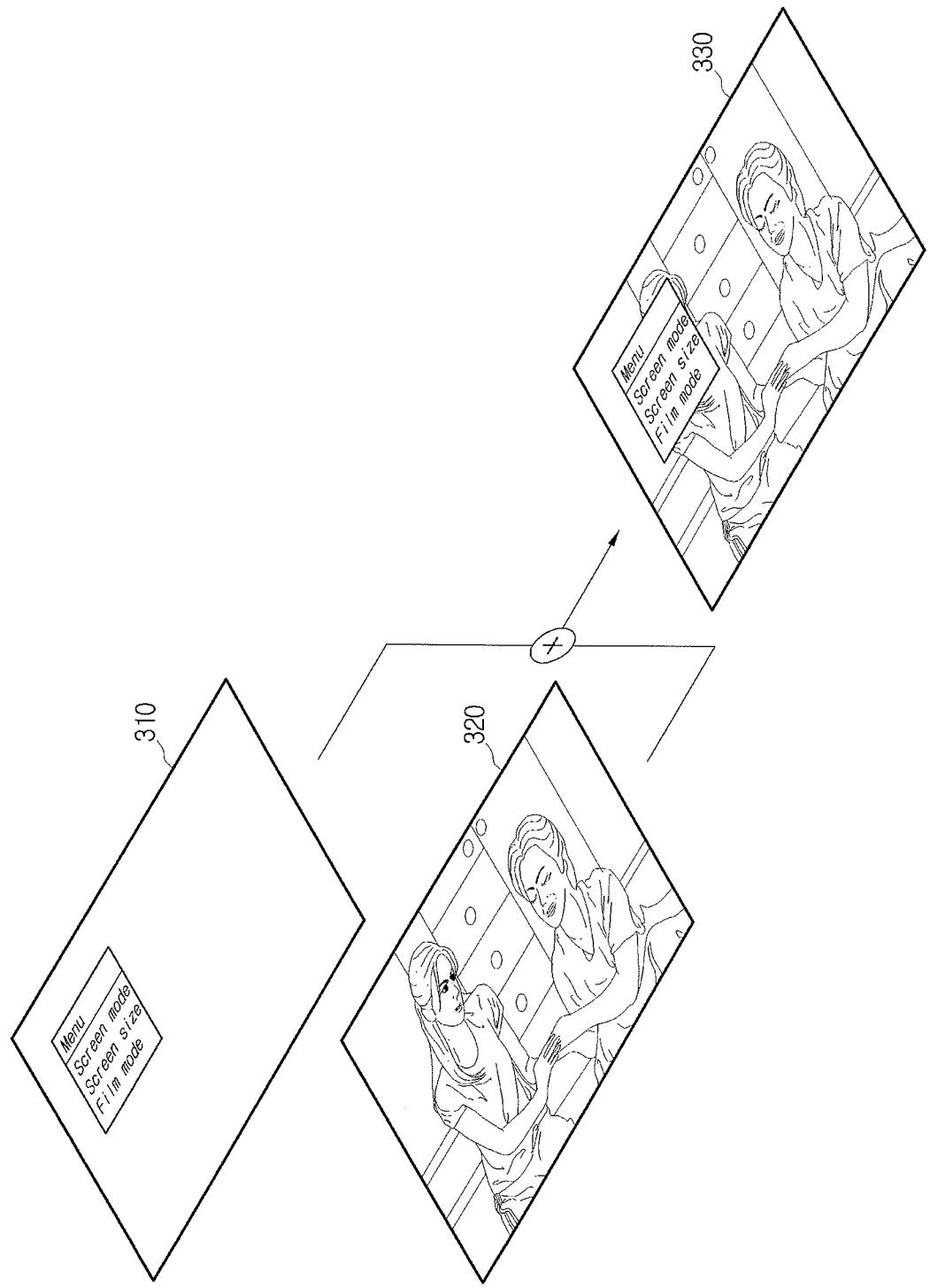
FIG. 4 is a view provided to illustrate operations S240 to S260 of FIG. 3.

Operations S240 and S250 are performed on a video layer 320 of FIG. 4. That is, the video layer 320 displays a FRC video after the scaling at the scaling unit 172.

The GUI in operation S260 is generated on a graphic layer 310 of FIG. 4. That is, a GUI generated by the GUI combination unit 176 is displayed on the graphic layer 310.

The process of combining a GUI with a FRC video in operation S260 is performed by overlapping the graphic layer 310 on the video layer 320, and generating a video 330 including the GUI as illustrated in FIG. 4.

The process that a DTV provides a user with a GUI through a display is described in detail with an exemplary embodiment of the present general inventive concept.

According to the exemplary embodiment of the present general inventive concept, a video apparatus provides a user with a GUI, by performing a FRC for a received signal (e.g., without GUI data), and combining a GUI with the frame rate converted (FRC) signal.

While a frame rate of a video is converted from 60 Hz to 120 Hz in the exemplary embodiment of the present general inventive concept, this should not be considered limiting, as any suitable video frame rate may be converted. The present general inventive concept may be applied when a FRC is performed at different frame rates from that of the exemplary embodiment of the present general inventive concept. For example, if a video system adopts a phase alternating line (PAL) instead of a national television system committee (NTSC), the video system may be implemented to convert a frame rate of a video from 50 Hz to 100 Hz.

While a GUI is combined with a FRC signal in the exemplary embodiment of the present general inventive concept, it is merely an exemplary embodiment of the present general inventive concept for a convenient description. For example, the present general inventive concept may be applied when a still image not performing a FRC is combined with a moving image performing a FRC.

The moving image and still image may be content from a received signal (e.g., broadcast digital television signal, etc.), or content stored in a DTV, or a storage device communicatively coupled to the DTV.

Figure 5:
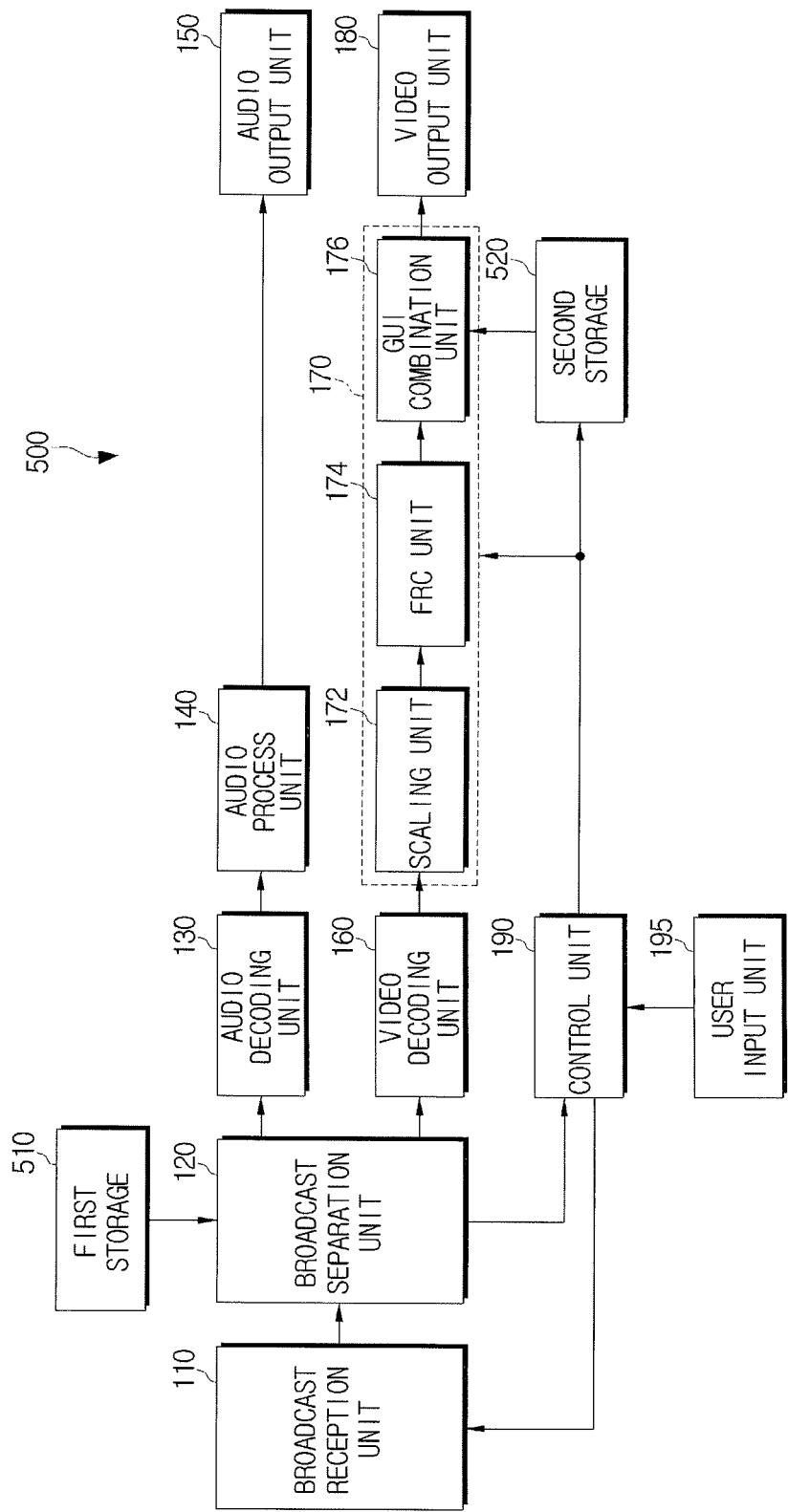
FIG. 5 is a block diagram illustrating a DTV according to an exemplary embodiment of the present general inventive concept.

A DTV 500 according to an exemplary embodiment of the present general inventive concept is illustrated in FIG. 5. The DTV 500 of FIG. 5 may include a first storage 510 and a second storage 520 in addition to the components of the DTV 100 of FIG. 2.

The first storage 510 stores a moving image, and the second storage 520 stores a still image. A FRC is performed for the moving image in the first storage 510, and the FRC moving image is combined with the still image not performing a FRC in the second storage 520.

The DTV 500 may not include both the first and second storages 510, 520, but the first and second storages 510, 520 may be provided selectively. For example, if a FRC is performed for a received signal, the signal may be combined with the still image in the second storage 520, so the first storage 510 may be excluded from the DTV.

The present general inventive concept may be applied when a moving image performing a FRC is combined with a moving image not performing a FRC, which may be easily conceived by skilled artisans.

The DTV is provided as a video apparatus in the exemplary embodiment of the present general inventive concept, but this should not be construed as limiting. Accordingly, other video apparatuses in addition to the DTV may be applied to the present general inventive concept. For example, a video apparatus may be a signal receiving apparatus such as a set-top box (STB) or a digital multimedia broadcast (DMB) reception apparatus, or various video apparatuses capable of replaying a video such as a mobile phone, a navigation device, a personal digital assistant (PDA), or a personal multimedia player (PMP).

As described above, according to the exemplary embodiment of the present general inventive concept, a FRC is performed for a video including no GUI, and a GUI is combined with the video after the FRC. Therefore, by performing a FRC, a moving image having increased quality is provided to a user, while minimizing and/or preventing artifacts from occurring around a boundary of a still image such as a GUI.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A video apparatus, comprising:
a separation section to separate audio, video, and additional data from a received data signal;

a conversion section to convert a frame rate of the video using motion estimation and motion compensation (MEMC);

a graphical user interface (GUI) combination section to generate a GUI without using MEMC, and to combine the generated GUI with a predetermined area of the converted frame rate video, the predetermined area having a different frame rate than the frame rate of the converted frame rate video;

a display unit to display images according to the GUI combined with the converted frame rate video, wherein the GUI generated without using MEMC is combined with the video after the frame rate conversion using MEMC is performed on the video; and a control section to control the conversion section and the GUI combination section to provide a desired GUI and the converted frame rate video to the display unit according to the additional data from the separation section.

2. The apparatus of claim 1, wherein the conversion section converts a frame rate of the video from 60 Hertz (Hz) to 120 Hz, or from 50 Hz to 100 Hz.

3. The apparatus of claim 1, further comprising:
a signal receiving section to receive the data signal and output it to a separate section;
a video decoding section to decode the video included in the received data signal and that is separated from the received data signal;
a scaling section to scale the video decoded by the video decoding section, and to transmit the scaled video to the conversion section; and
the display unit to display the video combined with the generated GUI from the GUI combination section.

4. A method of providing a graphical user interface (GUI), comprising:
separating audio, video, and additional data from a received data signal;
converting a frame rate of the video;
generating a GUI;
combining the generated GUI with a predetermined area of the converted frame rate video by a graphical user interface (GUI) combination section, a frame rate of the predetermined area having the GUI being different from that of the converted frame rate video;
displaying images according to the GUI combined with the converted frame rate video by a display unit, the GUI being combined with the video after the frame rate conversion is performed on the video; and
controlling the GUI combination section to provide a desired GUI to the display unit according to the additional data.

5. The method of claim 4, wherein the converting comprises:
converting a frame rate of the video using motion estimation and motion compensation (MEMC).

6. The method of claim 4, wherein the converting comprises:
converting a frame rate of the video from 60 Hertz (Hz) to 120 Hz, or from 50 Hz to 100 Hz.

7. The method of claim 4, further comprising:
decoding the video included in the received data signal; and
scaling the decoded video, wherein the converting comprises:
converting a frame rate of the scaled video; and
displaying the converted frame rate video combined with the generated GUI.

8. A video apparatus, comprising:
a separation section to separate audio, video, and additional data from a received data signal;
a conversion section to convert a frame rate of a moving image of a video;
a combination section to combine a still image of the video with a predetermined area of the moving image in which the frame rate is converted by the conversion section, the predetermined area having a different frame rate than the converted frame rate of the moving image;
a display unit to display an image according to the still image combined with the converted frame rate moving image, the GUI being combined with the moving image after the frame rate conversion is performed on the moving image; and
a control section to control the combination unit to provide a desired GUI to the display unit according to the additional data from the separation section.

9. The apparatus of claim 8, wherein the moving image is received by the video apparatus, and the still image is stored in the video apparatus.

10. A method of providing a graphical user interface (GUI) of a video apparatus, comprising:
separating audio, video, and additional data from a received data signal;
converting a frame rate of a moving image of a video;
combining a still image of the video with the converted frame rate moving image by a graphical user interface (GUI) combination section; and
controlling the GUI combination section to display a desired GUI according to the additional data,
wherein a frame rate of the video comprising the still image is different from that of a video comprising the converted frame rate moving image.

11. The method of claim 10, wherein the moving image is received by the video apparatus, and the still image is stored in the video apparatus.

12. A method of providing a video, comprising:
separating audio, video, and additional data from a received data signal, the video including at least one of a first video and a second video;
converting a frame rate of the first video, and displaying the first video on a first layer;
displaying the second video on a second layer without converting a frame rate of the second video by a display unit;
combining the first layer with the second layer by a combination section; and
controlling the combination section to provide a desired GUI to the display unit according to the additional data,
wherein the frame rate of the first video being different from that of the second video.

13. The method of claim 12, wherein the second layer displays a graphic to be overlayed on the video on the first layer.

14. A non-transitory computer readable medium having recorded thereon a program to implement a method of providing a graphical user interface (GUI), the method comprising:
separating audio, video, and additional data from a received data signal;
converting a frame rate of the video;
generating a GUI;
combining the generated GUI with a predetermined area of the video with the converted frame rate according to the additional data; and displaying the predetermined area of the video with the converted frame rate with the desired generated GUI, wherein a frame rate of the predetermined area comprising the GUI is different from the converted frame rate.

15. A method of displaying a video, comprising:

separating audio, video, and additional data from a received data signal;

converting a frame rate of the video;

combining the converted frame rate video with a least one image to form a composite video by a combination section;

displaying the composite video image by a display unit; and controlling the combination section to provide a desired GUI to the display unit according to the additional data, wherein a frame rate of the video comprising the at least one image is different from that of the converted frame rate video.

16. The apparatus of claim 1, wherein no frame rate conversion is performed on a still image associated with the GUI before being combined with the converted frame rate video.

17. The apparatus of claim 1, wherein a frame rate of the video comprising the GUI is different from that of the converted frame rate video.

18. The method of claim 4, wherein a frame rate of the video comprising the GUI is different from that of the converted frame rate video.

19. The video apparatus of claim 8, wherein a frame rate of the displayed image comprising the still image is different from that of the converted frame rate of the moving image.

* * * * *